UNITED STATES PATENT OFFICE.

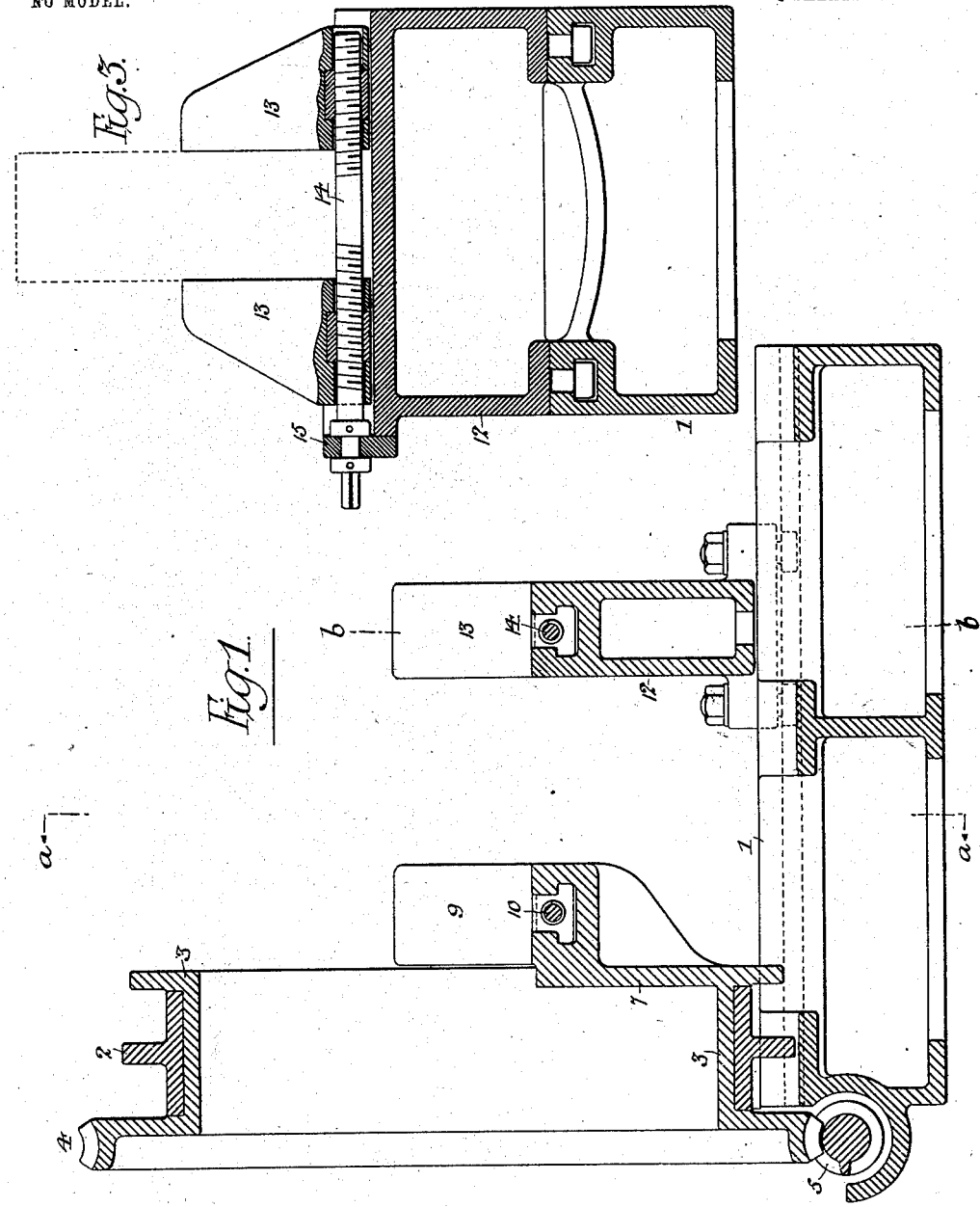

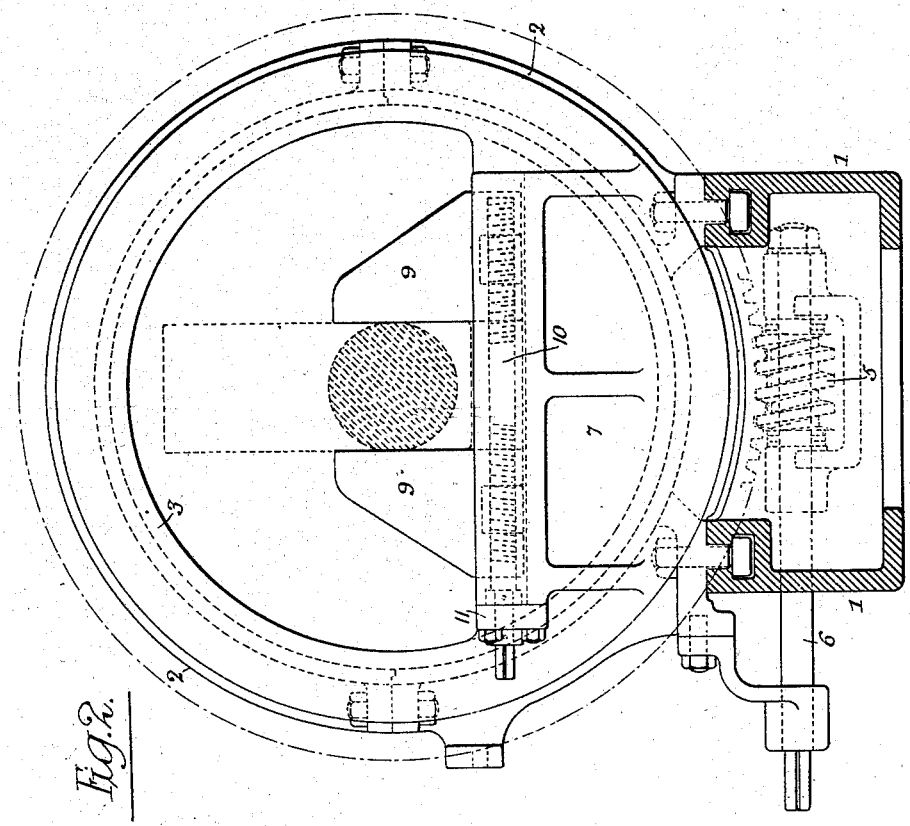

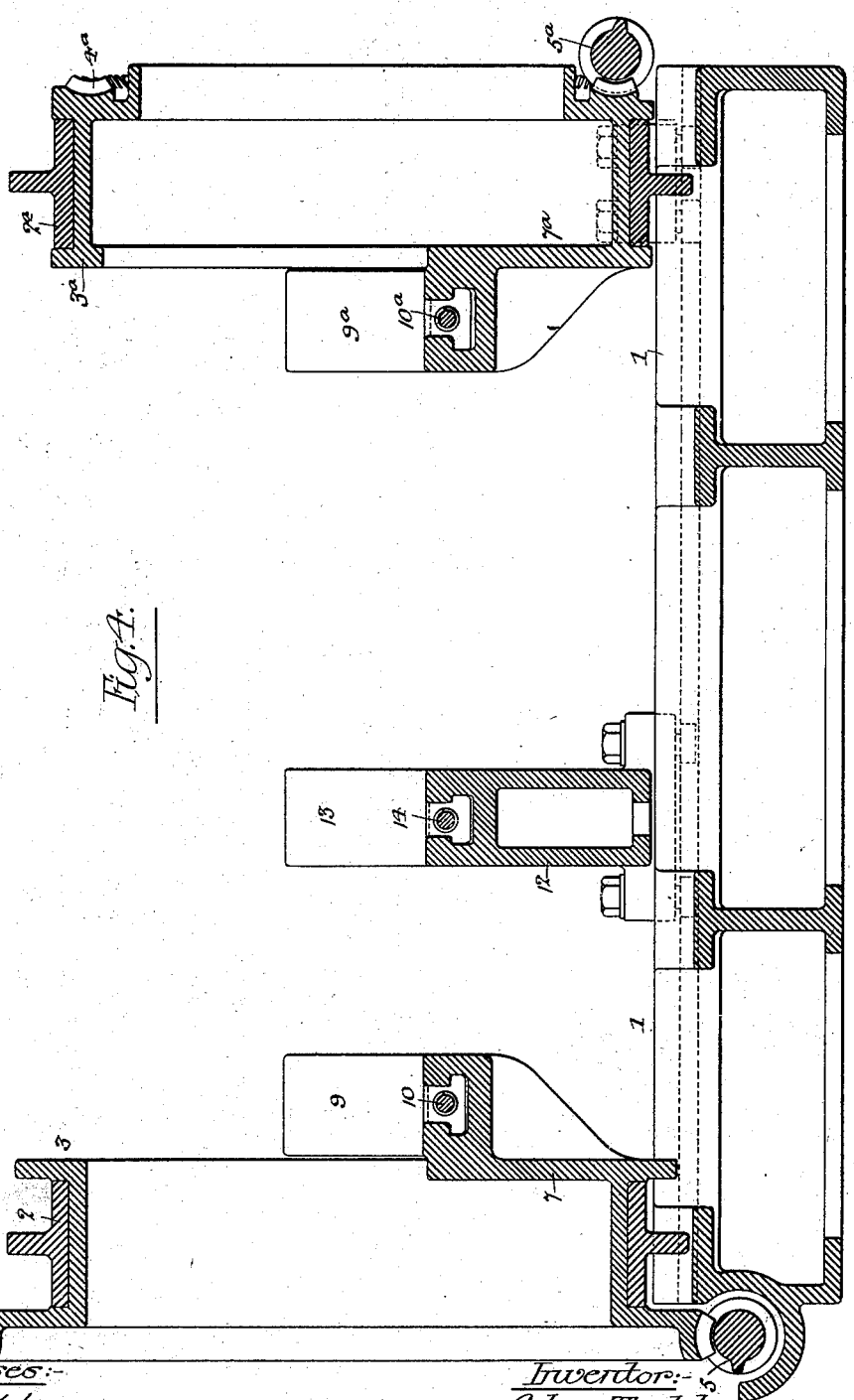

ADAM TINDEL, OF PHILADELPHIA, PENNSYLVANIA, ASSIGNOR TO TINDEL-MORRIS COMPANY, OF EDDYSTONE, PENNSYLVANIA, A CORPORATION OF PENNSYLVANIA.

ANGULAR-BENDING MACHINE.

SPECIFICATION forming part of Letters Patent No. 718,035, dated January 6, 1903.

Application filed April 26, 1902. Serial No. 104,779. (No model.)

*To all whom it may concern:*

Be it known that I, ADAM TINDEL, a citizen of the United States, residing in Philadelphia, Pennsylvania, have invented certain Improvements in Twisting-Machines, of which the following is a specification.

The object of my invention is to provide a simple and effective machine whereby a rod, bar, or shaft having thereon projections in the same longitudinal plane may be twisted so as to cause said projections to project radially from the shaft at any desired angle in respect to each other.

In the accompanying drawings, Figure 1 is a longitudinal section of a machine constructed in accordance with my invention. Fig. 2 is a transverse section on the line $a\,a$, Fig. 1. Fig. 3 is a view, partly in elevation and partly in transverse section, on the line $b\,b$, Fig. 1; and Fig. 4 is a longitudinal section illustrating another machine embodying my invention.

Referring first to the machine shown in Figs. 1, 2, and 3, it will be noted that a suitable bed-plate or frame 1 carries an annular bearing 2 for a ring 3, and secured to or forming part of this ring is a worm-wheel 4, meshing with a worm 5 on a transverse shaft 6, to which rotary movement may be imparted in any suitable manner. Across the front of the lower portion of the ring 3 extends a web 7, and in the upper portion of this web are formed grooved guides for a pair of jaws 9, those portions of said jaws which are adapted to the guides of the web 7 forming nuts for the reception of the threaded portions of a right-and-left screw 10, which is confined longitudinally to a cap-plate 11 at one end of the web 7, whereby on turning said screw-shaft the jaws 9 can be caused to move from and toward each other. The ring 3, with its web and jaws, thus constitutes an annular chuck having an opening extending longitudinally through the same. Longitudinally adjustable upon the bed-plate or frame 1 is a cross-head 12, the upper portion of which has guides similar to those of the web 7 for a pair of jaws 13, which can be moved from and toward each other by means of a right-and-left screw 14, longitudinally confined to a cap-plate 15 on the cross-head, as shown in Fig. 3.

In the operation of the machine, projections upon the rod, bar, or shaft are clamped one between the jaws 9 of the annular chuck and another between the jaws 13 of the cross-head 12, and the chuck is then turned throughout such an arc as to dispose the projections at the desired angle in respect to each other, the intervening portion of the rod, bar, or shaft being twisted accordingly, it being understood that the operation is performed while the rod, bar, or shaft is heated, so that such twisting of the same can be readily effected. Supposing, for instance, that a shaft has four projections equidistantly disposed upon it longitudinally, all of these projections being in the same plane for convenience in forging, and supposing that it is desired to dispose these projections at angles of ninety degrees in respect to each other upon the shaft, the cross-head 12 will first be adjusted upon the bed-plate or frame 1 so that its clamping-jaws 13 will engage the second of the projections on the shaft when the first or adjoining projection is engaged by the clamping-jaws 9 of the chuck. The projections being securely held in the clamps, the chuck is turned throughout an arc of ninety degrees, whereupon the clamps 9 and 13 are loosened and the shaft is moved longitudinally and is at the same time turned one-quarter way around, so as to apply the second projection to the clamping-jaws 9 and the third projection to the clamping-jaws 13, the first projection passing through the chuck. The projections being properly secured by the clamps, the chuck is again turned to the extent of ninety degrees in the same direction as before, and there is then a further longitudinal adjustment and partial turning of the shaft or bar, the third and fourth projections being now applied, respectively, to the clamps 9 and 13, and there is then a final partial turn of the chuck, the result being that the successive projections will be disposed around the shaft at angles of ninety degrees in respect to each other.

In the machine shown in Fig. 4 the parts of the machine shown in Figs. 1, 2, and 3 are combined with a second annular chuck comprising a ring 3ª, having clamping-jaws 9ª and mounted in a bearing 2ª, which is longitudinally adjustable on the bed-plate 1 in the same manner as the cross-head 12 and carries worm-gearing 4ª 5ª for rotating the chuck.

In a machine of this character three projections may be simultaneously acted upon—one by the clamp on the cross-head 12 and one by each of the clamps on the rotary chucks, the cross-head and one of the rotary chucks being adjusted longitudinally to suit the disposition of the projections—or a machine may be constructed in accordance with my invention in which the two rotary chucks are employed without the intervening cross-head, one of said chucks being adjustable from and toward the other, or in machines which are intended for acting upon a uniform class of work such longitudinal adjustment of either of the clamping devices may be dispensed with.

Having thus described my invention, I claim and desire to secure by Letters Patent—

1. A twisting-machine in which are combined a chuck, a bearing in which said chuck can be operated, a clamping device carried by said chuck, a cross-head adjustable longitudinally from and toward the chuck, and clamping-jaws carried by said cross-head, said jaws having means whereby each may be moved parallel to the other and thereby hold central a piece operated upon, substantially as described.

2. The combination in a twisting-machine of a chuck, consisting of a ring having a transverse web, a bearing engaging the external periphery of the chuck, with means for rotating said chuck, and a pair of clamping-jaws mounted on said web and provided with means whereby they may be moved toward or from each other, substantially as described.

3. The combination in a twisting-machine, of an open-center chuck consisting of a ring having a web extending across it, a pair of jaws mounted upon said web and adjustable toward and from each other, a bearing for said chuck and means for rotating the chuck to any desired extent in said bearing, substantially as described.

4. The combination in a twisting-machine, of a pair of chucks, each provided with a clamping device and a bearing for each chuck in which it can be rotated to any desired extent, a worm-gear on one of the chucks and a worm for operating the same, one of said bearings being adjustable longitudinally toward and from the other and having means whereby it may be temporarily clamped in any desired position, substantially as described.

5. The combination in a twisting-machine, of a pair of chucks, each provided with a clamping device, a bearing for each chuck in which it can be rotated to any desired extent, and a clamping device located between the two chucks, said device having adjustable jaws and being movable longitudinally, substantially as described.

6. The combination in a twisting-machine, of a pair of chucks, each provided with a clamping device, a bearing for each of said chucks in which it can be rotated to any desired extent, a cross-head located between the two chucks and provided with clamping-jaws, said cross-head and the bearing for one of the chucks being adjustable longitudinally from and toward the bearing for the other chuck, substantially as described.

In testimony whereof I have signed my name to this specification in the presence of two subscribing witnesses.

ADAM TINDEL.

Witnesses:
F. E. BECHTOLD,
JOS. H. KLEIN.